US010783482B2

(12) United States Patent
Phillips et al.

(10) Patent No.: US 10,783,482 B2
(45) Date of Patent: Sep. 22, 2020

(54) DATA STRUCTURE MANAGEMENT FOR PRODUCT PREPARATION AND DELIVERY

(71) Applicant: Capital One Services, LLC, McLean, VA (US)

(72) Inventors: Jeremy Phillips, Brooklyn, NY (US); Zhe Liu, McLean, VA (US); Daniel Filler, Oak Hill, VA (US)

(73) Assignee: Capital One Services, LLC, McLean, VA (US)

( * ) Notice: Subject to any disclaimer, the term of this patent is extended or adjusted under 35 U.S.C. 154(b) by 21 days.

(21) Appl. No.: 15/836,594

(22) Filed: Dec. 8, 2017

(65) Prior Publication Data

US 2019/0180229 A1    Jun. 13, 2019

(51) Int. Cl.
*G06Q 10/08* (2012.01)
*G06F 16/29* (2019.01)
*G06Q 30/06* (2012.01)
*G06Q 10/06* (2012.01)

(52) U.S. Cl.
CPC ......... *G06Q 10/0833* (2013.01); *G06F 16/29* (2019.01); *G06Q 30/0639* (2013.01); *G06Q 10/06311* (2013.01); *G06Q 10/0832* (2013.01)

(58) Field of Classification Search
CPC .... G06Q 50/12; G06Q 10/087; G06Q 10/083; G06Q 10/06311; G06Q 30/0633; G06Q 10/08; G06Q 10/06; G06Q 10/06316
See application file for complete search history.

(56) References Cited

U.S. PATENT DOCUMENTS

| 7,076,043 | B2 | 7/2006 | Curbow et al. |
| 7,287,002 | B1* | 10/2007 | Asher ............... G06Q 10/08 705/26.8 |
| 8,432,808 | B1 | 4/2013 | Dankberg et al. |
| 10,387,825 | B1* | 8/2019 | Canavor ......... G06Q 10/08355 |
| 2002/0188492 | A1* | 12/2002 | Borton ............... G06Q 10/06 705/7.13 |
| 2005/0071212 | A1 | 3/2005 | Flockhart et al. |

(Continued)

OTHER PUBLICATIONS

Ulmer, Marlin et al. "The Restaurant Meal Delivery Problem: Dynamic Pick-Up and Delivery with Deadlines and Random Ready Times", Oct. 12, 2017, University of Iowa, <https://doi.org/10.25820/hk5w-w761> (Year: 2017).*

*Primary Examiner* — Michael P Harrington
*Assistant Examiner* — Brian A Tallman
(74) *Attorney, Agent, or Firm* — Harrity & Harrity, LLP

(57) ABSTRACT

A device may receive a request for a product and, based on the request, determine a geographic location and delivery time for delivery of the product. The device may also identify a product location from which the product is capable of being provided. Based on the product and at least one product location characteristic, the device may determine an estimated fulfillment time associated with preparing the product for delivery. Based on the request and the product location, the device may identify a courier capable of transporting the product. In addition, the device may determine an estimated delivery time associated with delivering the product. The device may determine, based on the fulfillment time and the delivery time, a delay. The device may store the request in a data structure, associate the delay with the request, and perform an action based on the request and the delay.

20 Claims, 5 Drawing Sheets

(56) References Cited

U.S. PATENT DOCUMENTS

| | | |
|---|---|---|
| 2007/0088568 A1 | 4/2007 | Goodall et al. |
| 2009/0076875 A1 | 3/2009 | Lert, Jr. et al. |
| 2012/0078673 A1 | 3/2012 | Koke et al. |
| 2014/0074743 A1* | 3/2014 | Rademaker ............ G06Q 50/28 705/334 |
| 2014/0195452 A1* | 7/2014 | Horstemeyer ........ B60R 25/102 705/330 |
| 2014/0278635 A1* | 9/2014 | Fulton ............. G06Q 10/06311 705/7.14 |
| 2015/0170099 A1 | 6/2015 | Beach-Drummond |
| 2015/0227888 A1* | 8/2015 | Levanon ............ G06Q 10/0834 705/334 |
| 2016/0019495 A1* | 1/2016 | Kolchin ............ G06Q 10/0833 705/333 |
| 2016/0171584 A1* | 6/2016 | Cao .................... G06Q 30/0625 705/26.62 |
| 2016/0244311 A1* | 8/2016 | Burks .................. B67D 1/0888 |
| 2016/0292664 A1* | 10/2016 | Gilfoyle ................ G06Q 10/08 |
| 2016/0350837 A1* | 12/2016 | Williams ........... G06Q 30/0633 |
| 2017/0011319 A1* | 1/2017 | Elliot .................... G06Q 50/12 |
| 2017/0200120 A1* | 7/2017 | High ...................... G06T 11/60 |
| 2018/0089621 A1* | 3/2018 | Perez Barrara .... G06Q 10/0833 |

\* cited by examiner

DATA STRUCTURE MANAGEMENT FOR PRODUCT PREPARATION AND DELIVERY

BACKGROUND

Consumers may order and obtain products in a variety of ways. For example, a consumer may order and/or purchase a product by visiting a physical retail location site where products are stored and/or sold. Alternatively, a consumer may order and/or purchase a product online, by phone, by mail, or the like for, delivery of the product to the consumer via a carrier, such as a postal service.

SUMMARY

In some aspects, a device, comprises: one or more processors to: receive, from a first device, a request for a product; determine, based on the request, a geographic location for delivery of the product, and a delivery time for delivery of the product; identify, based on the request, a product location, the product location being a location from which the product is capable of being provided; determine, based on the product and at least one product location characteristic, an estimated fulfillment time, the estimated fulfillment time indicating a first amount of time associated with preparing the product for delivery at the product location; identify, based on the request and the product location, a courier, the courier being capable of transporting the product from the product location to the geographic location; determine, based on the geographic location, the delivery time, and the product location, an estimated delivery time, the estimated delivery time indicating a second amount of time associated with obtaining the product from the product location and delivering the product to the geographic location; determine, based on the first amount of time and the second amount of time, a delay, the delay indicating a third amount of time; store the request in a data structure; associate, in the data structure, the delay with the request; and perform an action based on the request and the delay.

In some aspects, a non-transitory computer-readable medium stores instructions, the instructions comprising: one or more instructions that, when executed by one or more processors, cause the one or more processors to: receive, from a first device, a request for a product; determine, based on the request, a geographic location for delivery of the product, and a delivery time for delivery of the product; identify, based on the request, a product location, the product location being a location from which the product is capable of being provided; identify, based on the request and the product location, a courier, the courier being capable of transporting the product from the product location to the geographic location; obtain, for the product location, one or more product location characteristics; obtain, for the courier, one or more courier characteristics; determine, based on the one or more product location characteristics and the one or more courier characteristics, a delay, the delay indicating a period of time; associate the delay with the request; and perform an action based on the request and the delay.

In some aspects, a method comprises: receiving, by a first device and from a second device, a request for a product; determining, by the first device and based on the request, a geographic location for delivery of the product, and a delivery time for delivery of the product; identifying, by the first device and based on the request, a product location, the product location being a location from which the product is capable of being provided; identifying, by the first device and based on the request and the product location, a courier, the courier being capable of transporting the product from the product location to the geographic location; obtaining, by the first device and for the product location, one or more product location characteristics; obtaining, by the first device and for the courier, one or more courier characteristics; determining, by the first device and based on the one or more product location characteristics and the one or more courier characteristics, a delay, the delay indicating a period of time; inserting, by the first device, the request into a queue based on the delay; and performing, by the first device, an action based on the queue.

DETAILED DESCRIPTION

Figure 1A:
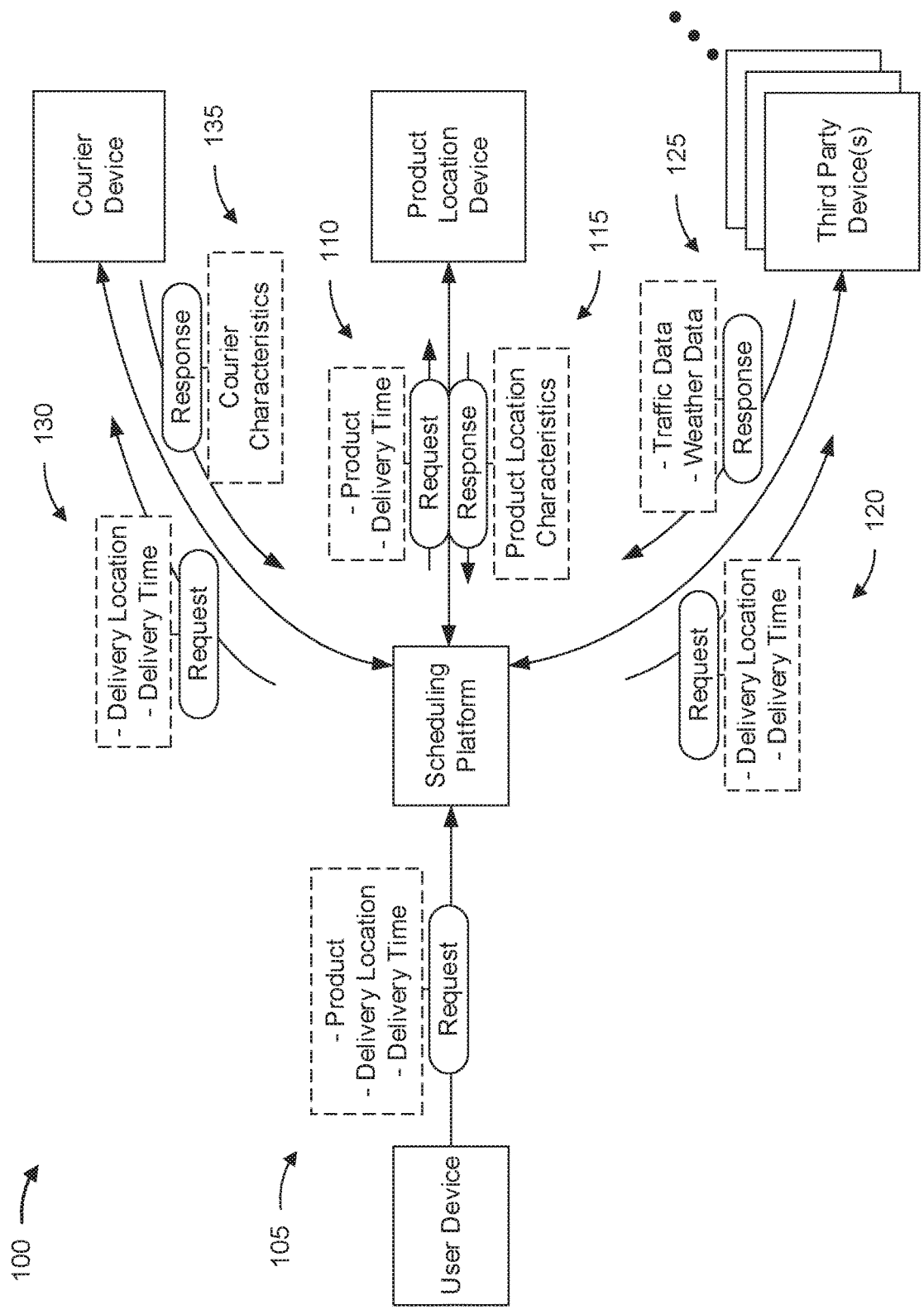
FIGS. 1A-1B are a diagram of an overview of an example implementation described herein.

The following detailed description of example implementations refers to the accompanying drawings. The same reference numbers in different drawings may identify the same or similar elements.

Consumers may often order products and receive the ordered products via delivery, such as delivery by a courier. Product orders are generally processed in an order that the product orders are received, and are generally prepared for delivery by one or more entities, often in a first in, first out manner. In the event that an entity that prepares or delivers an order is otherwise busy (e.g., with other orders or otherwise unavailable), a queue of orders for that entity might get backed up, causing orders to be forgotten or processed later than intended.

Some implementations, described herein, may provide a scheduling platform that gathers data from product location devices (e.g., devices located at locations that house a product), from courier devices (e.g., devices associated with independent contractors, drones, carriers, or the like), and/or from third party devices (e.g., devices that provide traffic data, weather data, and/or the like). Using the data gathered, the scheduling platform may determine (e.g., calculate) a delay associated with any given order for a product, the delay providing an indication of how long it takes to prepare and deliver the product.

After determining the delay associated with an order for a product, the scheduling platform can place the order in a data structure, such as a queue, and associate the order with the delay. By storing orders in a data structure and associating the orders with a delay, the scheduling platform can send (e.g., to product location devices, courier devices, and/or the like) instructions regarding the orders at a time when the order information is needed and avoid sending instructions regarding the orders at times when they are not needed, thereby allowing management of the data structure to remain on the scheduling platform and limiting the order information sent to product location devices and courier devices.

In this way, the scheduling platform may provide an improved user experience. For example, the scheduling platform may enable faster delivery of products by sending order information to devices associated with entities that are available to prepare and deliver the products, rather than having orders wait in a queue at devices associated with entities that are not capable of preparing and delivering the products in a timely manner. As another example, the scheduling platform may provide on-demand delivery of the product (e.g., delivery when the user wants the delivery, delivery scheduled within a specific future window, and/or the like). In addition, in some implementations, the scheduling platform may handle scheduling of hundreds, thousands, millions, etc., of orders for hundreds, thousands, millions, etc., of users.

Furthermore, by providing accurate delay calculation, the scheduling platform can avoid wasting resources, including computing resources, equipment resources, and personnel, which might otherwise be used to attempt to get a product prepared and/or delivered on time. Additionally, by handling management of the queue, the scheduling platform minimizes the order information that various entities are exposed to, thereby saving the entities that prepare and/or deliver products from concerns about a queue of orders backing up. Further still, devices associated with product locations and couriers may conserve resources based on the scheduling platform obviating the need for such devices to perform any local queue management, including data processing and storage of orders. In this way, product orders may be managed in a way that is designed to be more efficient than other product order handling methods in that it may, for example, lead to faster order fulfillment and delivery, less hardware resource consumption by devices involved in the product preparation and delivery process, and better workload management for entities responsible for preparation and delivery of products.

Figure 1B:
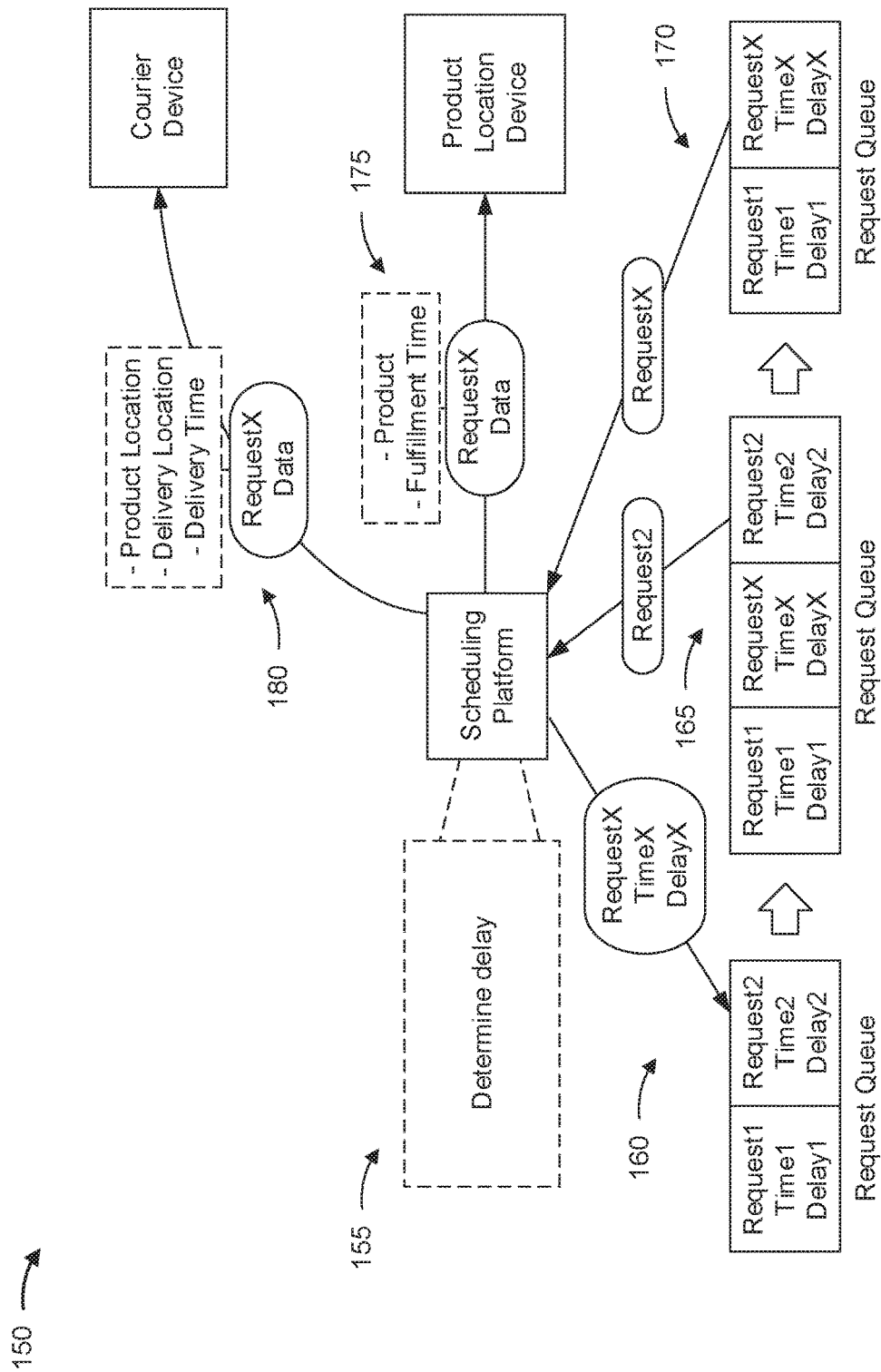

FIGS. 1A-1B are a diagram of an overview of an example implementation 100 described herein. As shown in FIG. 1A, example implementation 100 may include a user device, a scheduling platform, a product location device, a courier device, and one or more third party device(s). In some implementations, the scheduling platform may include a cloud computing platform, one or more server devices, and/or the like. The scheduling platform may be associated with an entity that provides products and/or services to users, such as a user associated with the user device. As one example, the scheduling platform may be associated with a bank that desires to offer quick delivery of banking products (e.g., credit cards, debit cards, cash, cashier's checks, etc.).

In some implementations, the product location device may include a device located at a physical location that may have products available, such as a warehouse, a retail location, product storage locker, and/or the like. In some implementations, the courier device may include a device associated with a courier (e.g., an entity capable of delivering a product, such as an independent contractor based delivery person, a delivery drone, a commercial carrier, and/or the like), such as a drone control device, a smart phone, a personal computer, a server computer, and/or the like. In some implementations, the third party devices may include other user devices, server devices, and/or the like, which are capable of providing relevant information to the scheduling platform.

As shown in FIG. 1A, and by reference number 105, the user device may send, to the scheduling platform, a request for a product. For example, a user of the user device may send a request for a cashier's check to the scheduling platform (e.g., using a banking application operating on the user device). In some implementations, data associated with the request may indicate the product, the location to which the product should be delivered (e.g., an address at which the user is or will be located), and a time at which the product is to be delivered (e.g., a time during which someone will be at home to receive the product).

As further shown in FIG. 1A, and by reference number 110, the scheduling platform may send a request to the product location device, such as a device associated with the product location that may have the product in stock, and/or may be near the delivery location. As shown by reference number 115, the scheduling platform may receive product location characteristics, such as a characteristic indicating a number of qualified product providers that are associated with the product location (e.g., qualified product providers being entities, such as equipment, device(s), and/or personnel, capable of preparing, at the product location, the product for delivery), a characteristic indicating an availability for at least one of the qualified product providers, a characteristic indicating a preparation time associated with preparation of the product for delivery, and/or the like.

As further shown in FIG. 1A, and by reference number 120, a scheduling platform may send, to the third party device(s), a request for information that may affect timing of a delivery. The request may be associated with information that the third party devices(s) can use to obtain and/or determine such information, such as a product location, a delivery time, and/or a delivery location. As shown by reference number 125, the scheduling platform may receive, from the third party devices, the information that may affect timing of a delivery, such as traffic data associated with traffic conditions (e.g., current or projected traffic conditions), and/or weather data associated with weather conditions (e.g., current or projected weather conditions), or the like.

As further shown in FIG. 1A, and by reference number 130, the scheduling platform may send, to the courier device, a request associated with data specifying the delivery location and the delivery time. In some implementations, the request may also be associated with product location information specifying the product location, as a courier may pick up the product at the product location. As shown by reference number 135, the scheduling platform may receive courier characteristics from the courier device. For example, the courier characteristics may include an availability of the courier, an estimated delivery time associated with delivering the product to a geographic location, traffic conditions associated with the courier, and/or the like.

As shown in FIG. 1B, the data provided to the scheduling platform in the example implementation 100 of FIG. 1A may be used to determine a delay associated with preparing the product at the product location associated with the product location device and delivering the product to the user of the user device by the courier associated with the courier device. Example implementation 150 may include the scheduling platform, the product location device, and the courier device. As shown by reference number 155, the scheduling platform may use the information received from the product location device, the courier device, and the third party devices, to determine a delay associated with the product location device and the courier device. For example, the delay may indicate, for the combination of the product location associated with the product location device and the courier associated with the courier device, an estimated amount of time to have the product prepared and/or delivered.

As further shown in FIG. 1B, and as shown by reference number 160, the scheduling platform may store data associated with the request in a request queue and may also associate the request with the delay. For example, as shown, the scheduling platform may store a request (shown as RequestX), a delivery time (shown as TimeX), and a calculated delay (shown as DelayX) in the request queue. The scheduling platform may place the request in the request queue based on time (e.g., based on delivery time and/or the delay). For example, the example request queue may include three requests for products that are to be delivered on a particular day and at a particular time (e.g., all three requests may have a delivery time of 9:00 A.M. on the same day; Delay1 may be 1 hour, Delay2 may be 2 hours, and DelayX may be 1 hour and 30 minutes). As shown by reference number 165, scheduling platform obtains Request2 from the request queue first based on the delay associated with Request2 (e.g., even though Time1, Time2, and TimeX are the same, Delay2 is greater than Delay1 and DelayX, indicating that RequestX may take more time to prepare and deliver than Request1 and/or Request2). The time at which scheduling platform obtains Request2 from the request queue may be, for example, Time2 minus Delay2 (e.g., 9:00 A.M. minus 2 hours, or 7:00 A.M.).

As further shown in FIG. 1B, and as shown by reference number 170, the scheduling platform may obtain RequestX from the request queue. RequestX is obtained prior to Request1, even though Request1 was received and queued prior to RequestX, based on the delivery times and delays for the requests. Using the example above, RequestX may be obtained at a time based on TimeX minus DelayX (e.g., 9:00 A.M. minus 1 hour and 30 minutes, or 7:30 A.M.).

As shown by reference number 175, the scheduling platform may send request data for RequestX to the product location device to enable an entity associated with the product location device to prepare the product for delivery. For example, the request data may include an identifier of the product and a fulfillment time indicating when the product should be prepared for pickup by a courier associated with the courier device. In some implementations, the request data may include or be associated with other data (e.g., entity schedules, product details, and/or the like) designed to enable the product to be prepared by the fulfillment time.

As shown by reference number 180, the scheduling platform may send request data for RequestX to the courier device to enable an entity associated with the courier device to pick up the product from the product location and deliver the product to the delivery location. For example, the request data sent to the courier device may include or be associated with data identifying the product location, the fulfillment time, the delivery location, and the delivery time. In some implementations, the request data sent to the courier device may include or be associated with other data (e.g., weather data, traffic data, and/or the like) designed to enable the product to be delivered by the delivery time.

As noted above, by storing orders in a data structure and associating the orders with a delay, the scheduling platform can send (e.g., to product location devices, courier devices, and/or the like) instructions regarding the orders at a time when the order information is needed and avoid sending instructions regarding the orders at times when they are not needed, thereby allowing management of the data structure to remain on the scheduling platform and limiting the order information sent to product location devices and courier devices.

In this way, the scheduling platform may provide an improved user experience. For example, the scheduling platform may enable faster delivery of products by sending order information to devices associated with entities that are available to prepare and deliver the products, rather than having orders wait in a queue at devices associated with entities that are not capable of preparing and delivering the products in a timely manner. As another example, the scheduling platform may provide on-demand delivery of the product (e.g., delivery when the user wants the delivery, delivery scheduled within a specific future window, and/or the like). In addition, in some implementations, the scheduling platform may handle scheduling of hundreds, thousands, millions, etc., of orders for hundreds, thousands, millions, etc., of users.

Furthermore, by providing accurate delay calculation, the scheduling platform can avoid wasting resources, including computing resources, equipment resources, and personnel, which might otherwise be used to attempt to get a product prepared and/or delivered on time. Additionally, by handling management of the queue, the scheduling platform minimizes the order information that various entities are exposed to, thereby saving the entities that prepare and/or deliver products from concerns about a queue of orders backing up. Further still, devices associated with product locations and couriers may conserve resources based on the scheduling platform obviating the need for such devices to perform any local queue management, including data processing and storage of orders. In this way, product orders may be managed in a way that is designed to be more efficient than other product order handling methods in that it may, for example, lead to faster order fulfillment and delivery, less hardware resource consumption by devices involved in the product preparation and delivery process, and better workload management for entities responsible for preparation and delivery of products.

As indicated above, FIGS. 1A-1B are provided merely as an example. Other examples are possible and may differ from what was described with regard to FIGS. 1A-1B.

Figure 2:
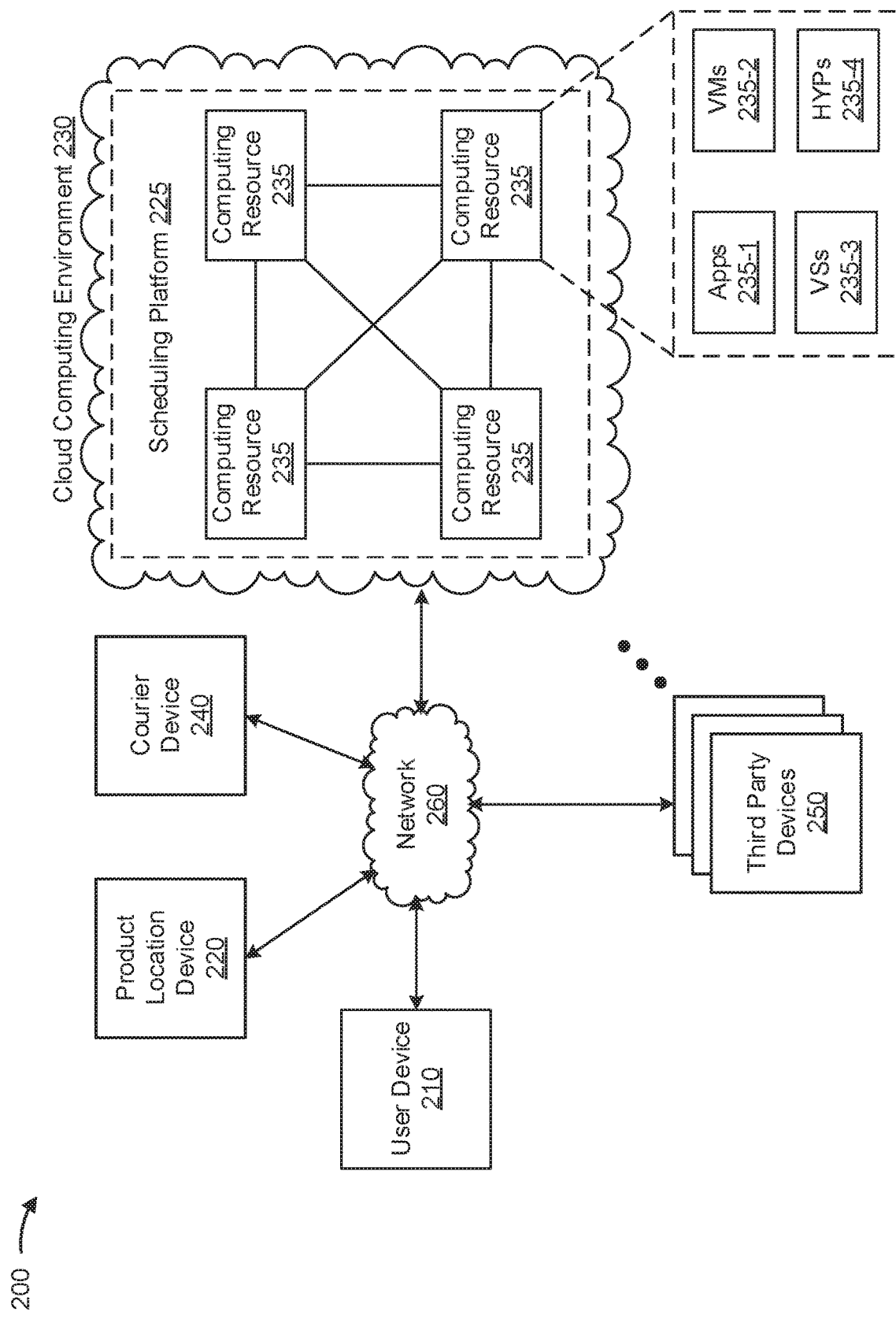
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, product location device 220, scheduling platform 225 hosted within a cloud computing environment 230, courier device 240, and third party devices 250. Devices of environment 200 may interconnect via wired connections, wireless connections, or a combination of wired and wireless connections.

User device 210 includes one or more devices capable of receiving, generating, storing, processing, and/or providing information associated with requests for products. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may include one or more applications for ordering products, such as a web browsing application for ordering products from a website, a scheduling platform application associated with scheduling platform 225 for ordering products from an entity associated with scheduling platform 225, and/or the like.

Product location device 220 includes one or more devices capable of receiving, generating, storing, processing, and/or providing information associated with products, including product availability and preparation times. For example, product location device 220 may include a communication and/or computing device, such as a mobile phone (e.g., a smart phone, a radiotelephone, etc.), a laptop computer, server computer, a tablet computer, a handheld computer, a gaming device, a wearable communication device (e.g., a smart wristwatch, a pair of smart eyeglasses, etc.), or a similar type of device. Product location device 220 may be associated with a product location (e.g., a location that houses products, which an entity associated with the product location can prepare for delivery to a user). In some implementations, product location device 220 may be associated with one or more entities associated with a product location (e.g., product location device 220 may be associated with a particular person at a product location, a particular piece of equipment at a product location, and/or the like). By way of example, product location device 220 may be a wearable communication device worn by a person capable of preparing a particular product or products for delivery. As another example, product location device 220 may be a computing device connected to a device for preparing products, such as a cashier's check printer capable of preparing cashier's checks for delivery. As yet another example, product location device 220 may be a computing device used for tracking personnel schedules and qualifications at a product location.

Scheduling platform 225 includes one or more devices capable of receiving, generating, storing, processing, and/or providing information associated with managing a data structure for product preparation and delivery. While the example environment 200 indicates that scheduling platform 225 is implemented in a cloud computing environment 230, in some implementations, scheduling platform 225 may be implemented by one or more other types of devices as well, such as a server computer, laptop computer, tablet computer, handheld computer, or the like. Scheduling platform 225 is capable of using data provided by user device 210, product location device 220, courier device 240, and/or third party devices 250 to calculate a delay for a product request and to manage a data structure of products requests based on the delay. Scheduling platform 225 may, in some implementations, include or otherwise have access to other resources to facilitate determining a delay associated with a request and managing a product request data structure, including resources for generating models via machine learning, resources for storing historical preparation and delivery data, or the like.

Cloud computing environment 230 includes an environment that delivers computing as a service, whereby shared resources, services, etc. may be provided to manage a data structure for product preparation and delivery. Cloud computing environment 230 may provide computation, software, data access, storage, and/or other services that do not require end-user knowledge of a physical location and configuration of a system and/or a device that delivers the services. As shown, cloud computing environment 230 may include scheduling platform 225 and computing resource 235.

Computing resource 235 includes one or more personal computers, workstation computers, server devices, or another type of computation and/or communication device. In some implementations, computing resource 235 may host scheduling platform 225. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with scheduling platform 225 and/or any other software capable of being provided via cloud computing environment 230. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 230, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Courier device 240 includes one or more devices capable of receiving, generating, storing, processing, and/or providing information associated with products, including product pickup and delivery times. For example, courier device 240 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Courier device 240 may be associated with a courier (e.g., an entity capable of picking up a product from a product location and delivering the product to a delivery location). In some implementations, courier device 240 may be associated with one or more entities capable of delivering a product (e.g., courier device 240 may be associated with a drone fleet management device, courier service server device, carrier server device, and/or the like). By way of example, courier device 240 may be a smart phone owned by a person capable of picking up a product from a product location and delivering that product to a delivery location. As another example, courier device 240 may be a drone fleet management device capable of scheduling and deploying drones to pick up and/or deliver products.

Third party devices 250 include one or more one or more devices capable of receiving, generating, storing, processing, and/or providing information associated with product preparation and delivery. For example, third party device 250 may include a communication and/or computing device, such as a server computer, mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Third party device 250 may be capable of providing a variety of information upon request. For example, third party device 250 may be associated with a weather server, which may provide weather-related information (e.g., current conditions, forecasted conditions, and/or the like) for particular geographic areas. As another example, third party device 250 may be associated with a traffic server, which may provide traffic-related information (e.g., automobile traffic, air traffic, and/or the like) for particular geographic areas and/or routes.

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
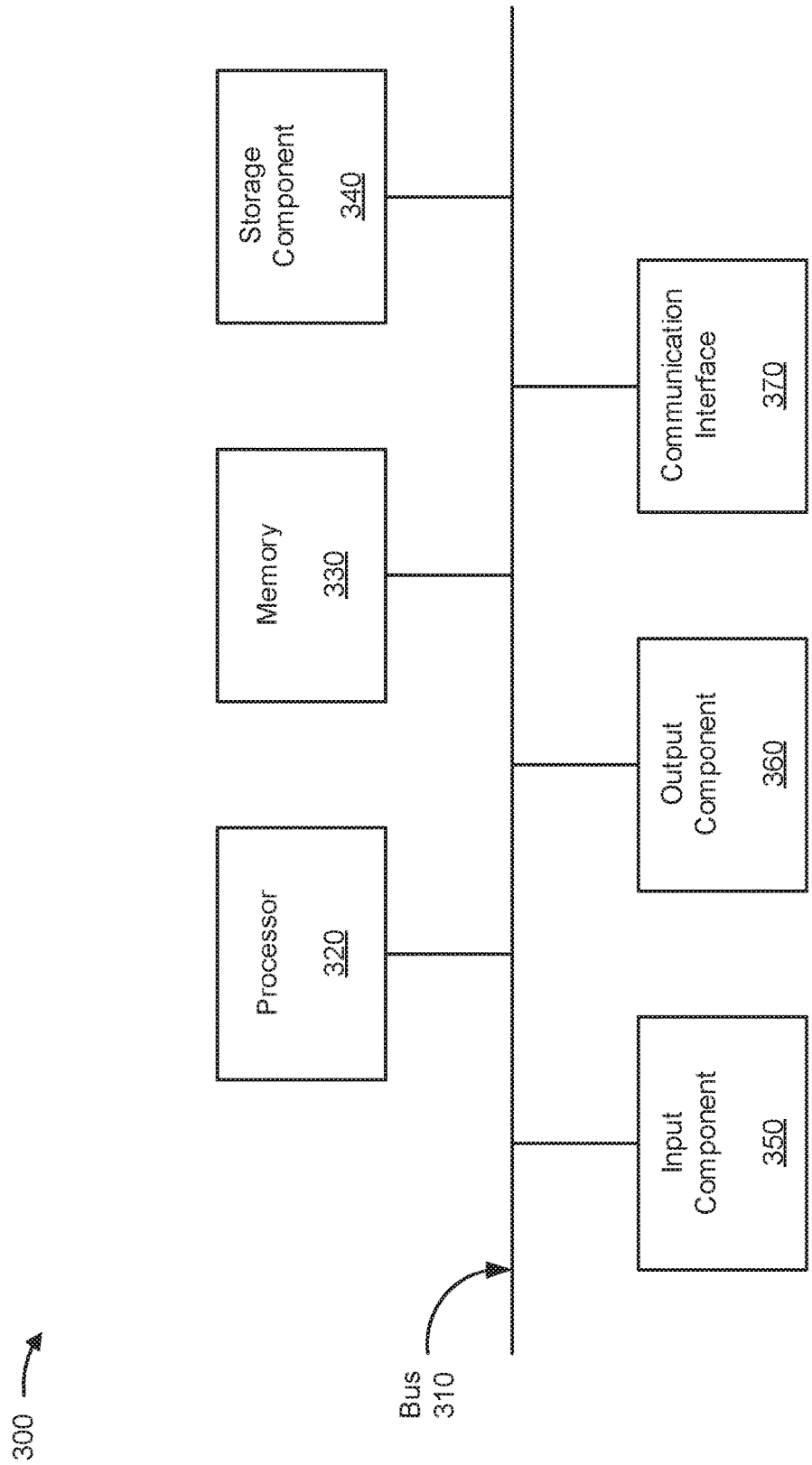
FIG. 3 is a diagram of example components of one or more devices of FIG. 2.

FIG. 3 is a diagram of example components of a device 300. Device 300 may correspond to user device 210, product location device 220, scheduling platform 225 hosted within a cloud computing environment 230, courier device 240, and/or third party devices 250. In some implementations, user device 210, product location device 220, scheduling platform 225 hosted within a cloud computing environment 230, courier device 240, and/or third party devices 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
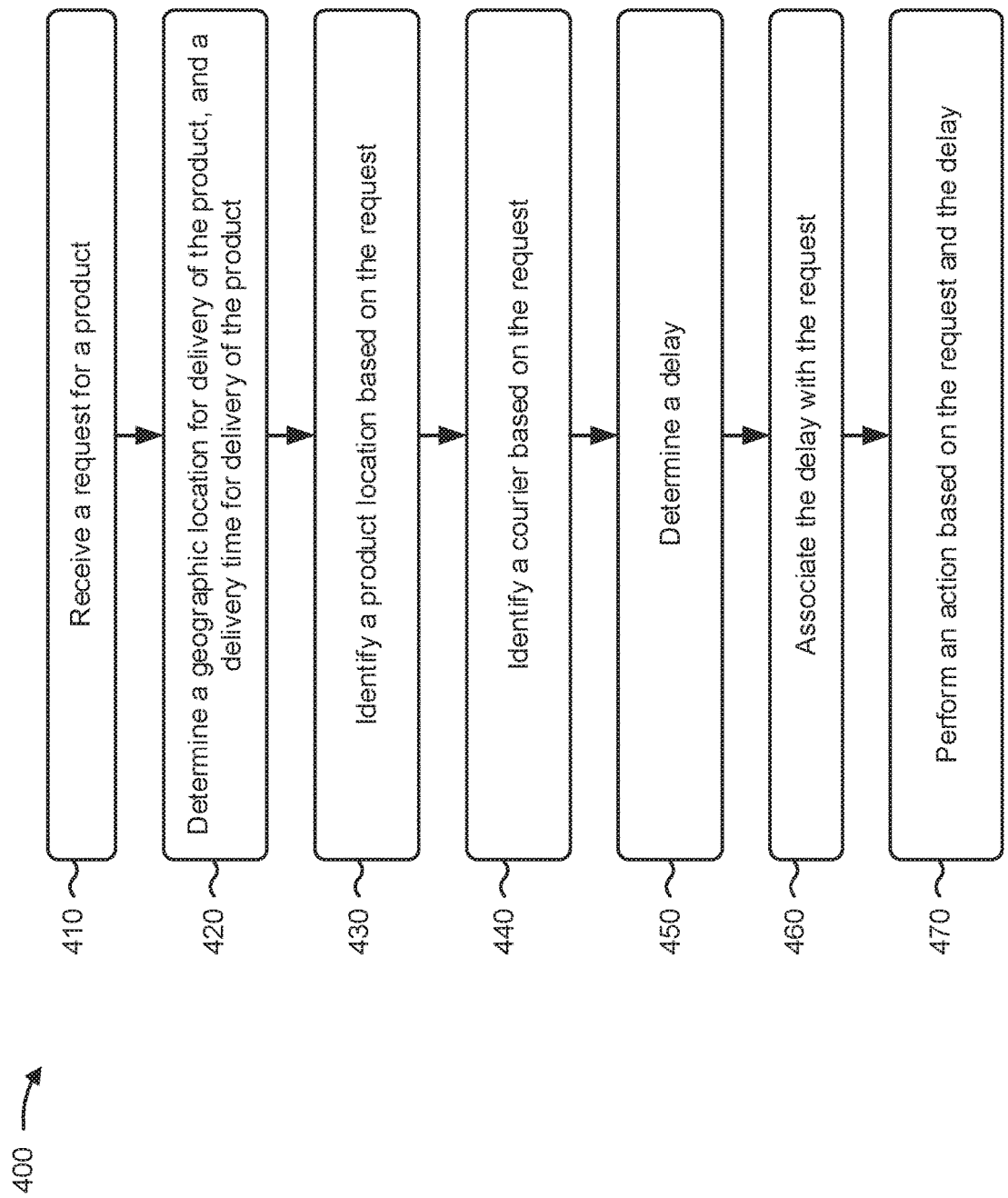
FIG. 4 is a flow chart of an example process for data structure management for product preparation and delivery.

FIG. 4 is a flow chart of an example process 400 for managing a data structure for product preparation and delivery. In some implementations, one or more process blocks of FIG. 4 may be performed by scheduling platform 225. In some implementations, one or more process blocks of FIG. 4 may be performed by another device or a group of devices separate from or including scheduling platform 225, such as user device 210, product location device 220, scheduling platform 225 hosted within a cloud computing environment 230, courier device 240, and/or third party devices 250. While portions of the following description use examples related to the delivery of a financial product, implementations described herein are equally applicable to other types of product deliveries, such as, food deliveries, electronics deliveries, clothing deliveries, deliveries of services personnel, and/or the like.

As shown in FIG. 4, process 400 may include receiving a request for a product (block 410). For example, scheduling platform 225 may receive a request for a product from user device 210, e.g., via network 260. User device 210 may send the request in a variety of ways, e.g., using an application operating on user device 210, including a communications application, ordering application associated with scheduling platform 225, web browsing application, and/or the like. In some implementations, the request may originate from scheduling platform 225 automatically, e.g., in response to user device 210 communicating preferences for periodic ordering of a product and/or product ordering in response to occurrence of a particular event.

In some implementations, the product may be a financial product, such as a credit card, a debit card, cash, a cashier's check, and/or the like. In some implementations, the request may indicate or be associated with data identifying the product, a delivery location to which the product is to be delivered, and/or a time at which the product is to be delivered. For example, the request may be sent with GPS data identifying a location of user device 210, and the location identified by the GPS data may be the delivery location. As another example, a user of user device 210 may provide input indicating a delivery location, such as a street address. The delivery time may be, for example, a specific date/time or a window of time on a particular date, and in some implementations the delivery time may be immediate (e.g., user is requesting the product be delivered as soon as possible). In this way, scheduling platform 225 may receive a request for a product, enabling scheduling platform 225 to determine a geographic location for delivery of the product and a delivery time for delivery of the product.

As further shown in FIG. 4, process 400 may include determining a geographic location for delivery of the product, and a delivery time for delivery of the product (block 420). For example, scheduling platform 225 may determine a geographic location for delivery of the product (e.g., delivery location), and scheduling platform 225 may determine a delivery time for delivery of the product. The delivery location and the delivery time may be determined, for example, based on data associated with the request provided by user device 210.

As noted above, in some implementations, scheduling platform 225 may determine the delivery location based on geo-location information (e.g., GPS data) that is provided by user device 210 and/or manually input by the user. Additionally, or alternatively, scheduling platform 225 may determine the delivery location based on address information, such as a home address of a user of user device 210 (e.g., stored on user device 210, previously obtained and stored by scheduling platform 225, and/or the like).

In some implementations, the delivery location may be non-static, and/or dynamically updated (e.g., in a situation where the delivery is to be made to a location associated with a moving user device 210). For example, user device 210 sensor data (e.g., GPS, Wi-Fi, Bluetooth, camera, and/or the like) may be periodically provided to scheduling platform 225, enabling scheduling platform 225 to determine where user device 210 is located during the product preparation and delivery process. This may enable scheduling platform 225 to more accurately enable delivery of the product to a location of user device 210. In some implementations, scheduling platform 225 may use user device 210 sensor data to determine a speed and direction of travel for user device 210 (e.g., in a manner designed to predict where user device 210 will be located). Additionally, or alternatively, scheduling platform 225 may notify user device 210 based on the sensor data (e.g., by providing user device 210 with a prompt regarding delivery to user device 210 or to a specific location of the user's choosing). Notifications may be sent to user device 210, for example, to confirm a delivery location (e.g., for every delivery, or based on particular events, such as when scheduling platform 225 lacks confidence in location prediction based on, for example, user device 210 speed meeting a threshold.

In some implementations, scheduling platform 225 may determine the delivery time based on a time specified by a user of user device 210. For example, the user may specify a particular time, such as a target time, a latest possible time, an earliest possible time, or the like. As another example, the user may specify a window of time, such as between an earliest possible time and a latest possible time. As another example, the user may specify guidance, a rule, a priority, and/or the like, such as "as soon as possible". In some implementations, scheduling platform 225 may provide, to a device (e.g., user device 210), data indicating available delivery times, and may receive, from the device, a selection from the available delivery times. In this situation, scheduling platform 225 may determine the delivery time based on the selection from the available delivery times. In this way, scheduling platform 225 may determine a geographic location for delivery of the product and a delivery time for delivery of the product, enabling scheduling platform 225 to identify a product location based on the request.

As shown in FIG. 4, process 400 may include identifying a product location based on the request (block 430). For example, scheduling platform 225 may identify a product location that is located in a geographic region associated with the delivery location. A product location is a location where products may be housed, such as a retail location, warehouse location, storage locker location, or the like.

In some implementations, scheduling platform 225 may identify a product location that may have (or will have) the requested product. For example, scheduling platform 225 may identify a product location that has the product based on inventory data available to scheduling platform 225, which may include product distribution data that indicates when a product location is to receive products. In some implementations, scheduling platform 225 may identify the product location based on requesting information, such as inventory data and/or product distribution data, from a product location device associated with the product location. Additionally, or alternatively, scheduling platform 225 may identify the product location based on information, such as inventory data and/or product distribution data, previously stored by or otherwise accessible to scheduling platform 225. In some implementations, a product location may be mobile (e.g., a mobile retail location or mobile product storage location). In this situation, scheduling platform 225 may identify the product location based on sensor data associated with product location device 220. For example, based on GPS, Wi-Fi, Bluetooth, or camera data from a product location device 220 associated with the product location, scheduling platform may determine the location of the corresponding product location.

In some implementations, scheduling platform 225 may identify a product location within a geographic region based on a threshold distance associated with the product location. For example, the threshold distance for the product location may be based on a range characteristic associated with the product location and/or a range characteristic of at least one potential courier associated with the product location. By way of example, the product location may be associated with multiple potential couriers (e.g., entities capable of delivering a product from the particular product location). In some situations, the potential couriers may be associated with a range characteristic (e.g., a maximum delivery range from the product location), and scheduling platform 225 may use the range characteristics to determine a threshold distance for the product location. For example, scheduling platform 225 may use, as the threshold distance associated with the product location, a mean, median, or maximum range from the potential couriers associated with the particular product location. As another example, the threshold distance may be predetermined for the product location.

In some implementations, scheduling platform 225 may identify a product location that includes a product preparing location associated with one or more entities capable of preparing the product for delivery. A product preparing location may be, for example, a retail location having equipment and/or people that are capable of preparing a product. For example, a bank branch location may include equipment for printing a cashier's check and personnel capable of authorizing the issuance of a cashier's check and packaging the cashier's check in an appropriate manner for delivery. Additionally, or alternatively, scheduling platform 225 may identify a product location that includes a storage location storing the product. For example, a storage location may include a storage locker or warehouse location that houses products which, in some implementations, may be pre-packaged for delivery. In this situation, the product may have been prepared for delivery prior to receipt of the request for the product and left at the storage location for later pickup and delivery by a courier.

In this way, scheduling platform 225 may identify a product location based on the request, enabling scheduling platform 225 to identify a courier based on the request.

As shown in FIG. 4, process 400 may include identifying a courier based on the request (block 440). For example, scheduling platform 225 may identify a courier based on the request. In some implementations, the courier may include an entity capable of transporting the product from the product location to the delivery location. For example, the courier may be an independent contractor based delivery person, a drone, a commercial carrier, and/or the like. The courier may also be associated with courier device 240 (e.g., a computing device used to enable the courier to perform the product delivery).

In some implementations, scheduling platform 225 may identify the courier based on obtaining courier characteristics. For example, courier characteristics may include data indicating a cost associated with a courier, data indicating a range associated with a courier, data indicating availability for a courier, data indicating traffic conditions associated with a courier, data indicating an estimated delivery time to the delivery location, and/or data indicating insurance characteristics associated with a courier. Scheduling platform 225 may obtain courier characteristics in a variety of ways. For example, courier characteristics may be stored by or otherwise accessible to scheduling platform 225, courier characteristics may be requested from courier device 240, or scheduling platform 225 may broadcast, in a geographic region near the product location and/or delivery location, a request for courier characteristics from courier device 240.

In some implementations, scheduling platform 225 may identify the courier based on the range associated with the potential courier (e.g., a courier may be identified as a potential courier if it is capable of picking up a product from the product location and delivering it to the delivery location). In some implementations, scheduling platform 225 may identify the courier based on data indicating availability for the potential courier (e.g., a courier may not be identified as the courier if the courier is otherwise engaged or otherwise unable to deliver a product within the requested time window). In some implementations, scheduling platform 225 may identify the courier based on an estimated delivery time associated with the courier. In some implementations, scheduling platform 225 may identify the courier based on an insurance characteristic, or insurance policy, associated with the courier (e.g., for some products, scheduling platform 225 may require a particular type of insurance for a courier to be eligible to be the courier). As noted above, other courier characteristics (such as the cost of a courier or traffic conditions on a delivery route) may be used, alone or in combination with each other or any of the above courier characteristics, to identify the courier.

In this way, scheduling platform 225 may identify a courier based on the request, enabling scheduling platform 225 to determine a delay.

In some implementations, scheduling platform 225 may identify the product location and the courier based on a combination of data provided by product location device 220, courier device 240, and/or third party devices 250. For example, scheduling platform 225 may identify the product location and/or the courier by providing information obtained from user device 210, product location device 220, courier device 240, and/or third party devices 250 to an artificial intelligence model (e.g., a machine learning model) trained to select a product location and/or a courier based on the obtained information (e.g., delivery location, delivery time, product location, fulfillment time, product location characteristics, courier characteristics, and/or the like). For example, scheduling platform 225 may provide, for the product location, a scheduling model with at least one product location characteristic associated with the product location and at least one courier characteristic associated with the courier. In this situation, the scheduling model may have been trained to produce, as output, an estimated completion time associated with delivery of the product to the delivery location. In some implementations, the scheduling model may be trained to produce, as output, an estimated cost associated with delivery of the product to the delivery location.

In some implementations, the scheduling model may be trained to produce, as output, a score that provides a measure with which scheduling platform 225 may evaluate a particular combination of a product location and a courier. For example, the scheduling model may produce a score for a combination of product location and courier, the score being based on input data indicating courier cost, courier ability to deliver on time, fulfillment time associated with the product location, and/or the like. Scores output from the scheduling model may be compared and/or ranked to identify the product location from which the requested product will be prepared and to identify the courier that will pick up the requested product from the product location and deliver it to the delivery location. Other types of machine learning models may be used by scheduling platform 225 to facilitate identification of the product location and/or the courier. In some implementations, identification may be automatic (e.g., based on highest ranked machine learning scores or the like), and in some implementations, identification may be made by a user associated with scheduling platform (e.g., scheduling platform 225 may receive input from user selecting the product location and the courier). In this way, scheduling platform 225 may identify the product location and the courier, enabling scheduling platform 225 to determine a delay.

As shown in FIG. 4, process 400 may include determining a delay (block 450). For example, scheduling platform 225 may determine a delay. In some implementations, the delay may be associated with an order for a product, and may provide an indication of how long it takes to prepare and deliver the product. Scheduling platform 225 may, in some implementations, determine the delay based on the identification of a product location and courier. For example, after identifying the product location and courier (e.g., as in blocks 430 and 440, above), scheduling platform may determine the delay associated with the combination of the product location and courier.

In some implementations, scheduling platform 225 may determine the delay based on an estimated fulfillment time. For example, the estimated fulfillment time may indicate an amount of time associated with preparing the product for delivery at the product location. In this situation, the fulfillment time may be based on the amount of time required for the product to be identified, prepared, generated, retrieved, reviewed, approved, or the like. In some implementations, scheduling platform 225 may determine the estimated fulfillment time based on the product and at least one of the product location characteristics. For example, some products may take longer to prepare than others. In a situation where a product is pre-manufactured, pre-packaged, and requires no special qualifications to prepare for delivery, the fulfillment time may be relatively short (e.g., the time it may take equipment or personnel to obtain and label the product for delivery). In a situation where a product requires assembly or further work to be in condition for delivery, packaging, and/or certain qualifications for assembly, packaging, and/or the like, the fulfillment time may be relatively long (e.g., especially long for products that require extensive assembly or work, products that require personnel not scheduled to be available at the product location for a period of time, and/or the like).

In some implementations, fulfillment time may be based on historical fulfillment times (e.g., historical fulfillment times associated with the product, the product location, the entity or entities capable of preparing the product for delivery, and/or the like). By way of example, if the product takes an average of one hour to prepare for delivery at the product location, scheduling platform 225 may determine that the fulfillment time, in this situation, should be one hour. In some implementations, the fulfillment time may be determined based on similar historical information (e.g., fulfillment times associated with other products, other product locations, and/or other product preparing entities). For example, in a situation where fulfillment times are not available and/or not numerous enough for a reasonable estimate (e.g., reasonable based on a threshold number of previous fulfillment times), scheduling platform 225 may determine fulfillment time based on historical fulfillment times of a similar product and/or historical fulfillment times of the same product at a different product location.

In some implementations, scheduling platform 225 may determine fulfillment time based on sensor data provided by product location device 220. For example, the product location may include one or more sensor devices (e.g., proximity sensor(s), Wi-Fi device(s), Bluetooth device(s), near field communication (NFC) device(s), and/or the like) capable of communicating with product location device 220 to determine when product location device 220 is in a particular physical area of the product location (e.g., the particular physical area being an area set aside for preparing one or more products for delivery). In this situation, the sensor data (e.g., indicating when product location device 220 entered and left the particular physical area set aside for preparing products for delivery) obtained by product location device 220 can be provided to scheduling platform 225, which may then use the sensor data to determine the fulfillment time.

In some implementations, scheduling platform 225 may determine the fulfillment time based on a fulfillment time model, such as a fulfillment time model trained to provide an estimated fulfillment time based on product location characteristics (e.g., the product inventory, number of qualified product providers, availability of the qualified product providers, and/or the like). For example, scheduling platform 225 may provide, to the fulfillment time model, at least one product location characteristic associated with the product location and receive, as output, an estimated fulfillment time associated with preparation of the product for delivery. In some implementations, the estimated fulfillment time may be associated with a measure of confidence that indicates the measure of confidence, determined by the fulfillment model, that the estimated fulfillment time is accurate. In this situation, whether the estimated fulfillment time provided by the fulfillment model is used as the fulfillment time may depend on the measure of confidence. For example, in a situation where the measure of confidence does not meet a threshold measure of confidence, scheduling platform 225 may use a different value for the fulfillment time (e.g., a fulfillment time based on historical data, sensor data, a combination of fulfillment time based on historical data and the estimated fulfillment time, and/or the like).

Additionally, or alternatively, scheduling platform 225 may determine the delay based on an estimated delivery time. For example, the estimated delivery time may indicate an amount of time associated with obtaining the product from the product location and delivering the product to the delivery location. In some implementations, scheduling platform 225 may determine the estimated delivery time based on the delivery location, the delivery time, and the product location. In some implementations, the estimated delivery time may be based on courier characteristics associated with the identified courier (e.g., an availability of the courier, traffic conditions associated with the courier, an estimated delivery time provided by the courier, and/or the like). For example, scheduling platform 225 may provide request data (e.g., including the product location, delivery location, and delivery time) to courier device 240 associated with the courier, and courier device 240 may provide scheduling platform 225 with an estimated delivery time based on the request data.

In some implementations, the estimated delivery time may be based on historical delivery times (e.g., historical delivery times associated with the product, the product location, the courier, the delivery time, the delivery location, and/or the like). By way of example, in a situation where scheduling platform 225 determines that it takes an average of thirty minutes for the courier to deliver a product from the product location to the delivery location, scheduling platform 225 may determine that, in this situation, the estimated delivery time should be thirty minutes. In some implementations, the estimated delivery time may be determined based on similar historical information (e.g., delivery times associated with other products, other product locations, other couriers, other delivery times, other delivery locations, and/or the like). For example, in a situation where historical delivery times are not available and/or not numerous enough for a reasonable estimate (e.g., reasonable based on a threshold number of previous delivery times), scheduling platform 225 may determine an estimated delivery time based on historical delivery times of a similar courier delivering to a similar delivery location, historical delivery times of the same courier at a different delivery location (e.g., a different delivery location near the delivery location), and/or the like.

In some implementations, scheduling platform 225 may determine the estimated delivery time based on a delivery time model, such as a delivery time model trained to provide an estimated delivery time based on information associated with the delivery of the product, such as the product location, fulfillment time, delivery location, delivery time, and/or courier characteristics. For example, scheduling platform 225 may provide, to the delivery time model, the product location, the delivery location, the delivery time, and at least one courier characteristic associated with the courier and receive, as output, an estimated delivery time associated with delivering the product to the delivery location. In some implementations, the estimated delivery time may be associated with a measure of confidence that indicates the measure of confidence, determined by the delivery time model, that the estimated delivery time is accurate. In this situation, whether the estimated delivery time provided by the delivery time model is used as the estimated delivery time may depend on the measure of confidence. For example, in a situation where the measure of confidence does not meet a threshold measure of confidence, scheduling platform 225 may use a different value for estimated delivery time (e.g., an estimated delivery time based on historical data, a combination of estimated delivery time based on historical data and the estimated delivery time produced by the delivery time model, or the like).

In some implementations, scheduling platform 225 may determine the delay based on at least one environmental characteristic, such as weather conditions, traffic conditions, and/or the like. For example, scheduling platform 225 may obtain an environmental characteristic from third party device 250. In some implementations, the environmental characteristic may include a weather characteristic indicating weather conditions associated with the delivery location, the product location, and/or an area between the delivery location and the product location. Additionally, or alternatively, the environmental characteristic may include a traffic characteristic indicating traffic conditions associated with the geographic location, the product location, and/or the area between the geographic location and the product location. Scheduling platform 225 may use one or more environmental characteristics to determine a separate delay value and/or include one or more environmental characteristics in the determination of estimated fulfillment time and/or estimated delivery time. For example, in a situation where a courier is a drone device, and weather conditions indicate that the drone device will be unable to begin delivery until weather conditions permit in three hours, scheduling platform may use the three hours as an environmental delay (e.g., to be used to determine the delay). As another example, traffic conditions may be included as an input to a delivery time model that provides the estimated delivery time.

In some implementations, scheduling platform 225 determine the delay by introducing an additional delay. For example, scheduling platform may determine the delay by adding the fulfillment time, the estimated delivery time, and the additional delay. The additional delay may be determined in a manner similar to the manner in which fulfillment time and/or estimated delivery time are determined, as described above (e.g., based on historical data, a machine learning model, and/or the like). The additional delay may be designed to represent error in the fulfillment time and/or estimated delivery time, or potential delay in the preparation and delivery process. For example, additional delay may be introduced to account for unforeseen (by scheduling platform 225) changes in the preparation and delivery process, such as sudden changes in weather or traffic, qualified product provider schedule changes, and/or the like. In situations where scheduling platform 225 introduces an additional delay when determining the delay, the resulting delay may represent an amount of time that is greater than the sum of the fulfillment time and the estimated delivery time.

In some implementations, scheduling platform 225 may improve determinations regarding fulfillment time and/or estimated delivery time by obtaining delivery data indicating a completion time associated with delivery of the product to the geographic location. For example, scheduling platform 225 may use data regarding the timing of deliveries as historical data for future determinations of delay, as input data for updating one or more models used to determine delay, and/or the like.

In this way, scheduling platform 225 may determine a delay, enabling scheduling platform 225 to associate the delay with the request. Associating the delay with the request may, for example, enable scheduling platform 225 to manage requests for products based on the delays determined for those products.

As shown in FIG. 4, process 400 may include associating the delay with the request (block 460). For example, scheduling platform 225 may associate the delay with the request. In some implementations, scheduling platform 225 may associate the delay with the request by inserting the request (and the delay) into a data structure. For example, scheduling platform 225 may insert the request into a queue based on the delay, though other data structures, such as a list, array, database, and/or the like, may be used. When associating the delay with the request in a data structure, scheduling platform 225 may also associated other data with the request, such as the product to be delivered, the delivery time, the fulfillment time, the product location, and/or the like.

Scheduling platform 225 may insert, into the data structure, information related to a variety of requests. In some implementations, the data structure may store all requests obtained by scheduling platform 225, all requests for a geographic region, all requests for a product location, all requests for a courier, and/or the like. In this way, scheduling platform 225 may manage multiple requests, e.g., using one or more data structures and based on the delay associated with each request stored in its corresponding data structure.

By way of example, scheduling platform 225 may use a queue to manage requests for products in a particular geographic area. Each request associated with the particular geographic area may be stored in a queue and associated with information related to the request, including the delay. Scheduling platform 225 may insert the request into the queue before or after other requests based on the delay associated with the request and other delays associated with the other requests. For example, a queue may include a first request for a product that is to be delivered at a delivery time of 3:00 P.M., and the first request may be associated with a delay determined to be one hour and thirty minutes. Scheduling platform 225 may insert a second request into the queue, the second request being associated with a delivery time of 4:00 P.M., and the second request may be associated with a delay of three hours. In this situation, and based on the delays, the second request may be placed ahead of the first request in the queue (e.g., in a manner designed to cause the preparation and delivery process to begin for the second request prior to the first request).

As noted above, scheduling platform 225 may use a variety of different types of data structures to associate the request with the delay, e.g., in a manner designed to manage requests at scheduling platform 225 as opposed to sending information regarding the request out immediately, which would consume resources of the corresponding product location device 220 and courier device 240. In this way, scheduling platform 225 may associate the delay with the request, enabling scheduling platform 225 to perform an action based on the request and the delay.

As shown in FIG. 4, process 400 may include performing an action based on the request and the delay (block 470). For example, scheduling platform 225 may perform an action based on the request and the delay. The actions performed may vary, and in some implementations, multiple actions may be performed. Some example actions are designed to facilitate timely (e.g., quick and/or within a particular time) fulfillment (e.g., preparation and packaging) and delivery of a product to the delivery location specified by the user while delaying the sending of information regarding the requested products until appropriate for the recipient devices to receive the information.

In some implementations, scheduling platform 225 may cause the product to be prepared for delivery. For example, scheduling platform 225 may provide, to product location device 220 associated with the product location, data that causes the product to be prepared for delivery. In some implementations, scheduling platform 225 may determine that a current time is equal to the delivery time minus the delay, may obtain the request from a queue based on the determination that the current time is equal to the delivery time minus the delay, and may provide, to a device associated with the product location (e.g., product location device 220), data associated with the request after obtaining the request from the queue.

In some implementations, when providing data that causes the product to be prepared for delivery, scheduling platform 225 may provide the data based on a notification time. For example, scheduling platform 225 may determine the notification time by subtracting, from the delivery time, an amount of time associated with the delay. By using the delay to determine the notification time, scheduling platform 225 withholds providing information regarding the request until it is ready to be acted upon by product location device 220 (and/or an entity associated with the product location device), obviating any need to store information related to the request at product location device 220 when the information is not ready to be acted upon.

In some implementations, scheduling platform 225 may receive, from a device associated with the product location (e.g., product location device 220), data indicating that the product will not be prepared for delivery. In this situation, based on the data indicating that the product will not be prepared for delivery, scheduling platform 225 may perform an action to provide, to another device associated with the product location (e.g., a different product location device 220), data that causes an entity associated with the different product location device 220 to prepare the product for delivery. For example, product location devices 220 may include software enabling users associated with the product location devices 220 to reject a request to prepare a product for delivery (e.g., based on lack of availability), which may cause scheduling platform 225 to provide the request to a different product location device 220. In this way, scheduling platform 225 may ensure the product is prepared in a timely manner.

In some implementations, scheduling platform 225 may broadcast information related to the request to multiple product location devices 220 based on the delay. For example, using the delay, scheduling platform 225 may broadcast data to an application operating on multiple product location devices 220, the data enabling users of the corresponding product location devices 220 to accept the product request. In this way, scheduling platform 225 may enable multiple entities to claim responsibility for preparing a product for delivery, and by using the delay to determine when to broadcast the request, scheduling platform 225 ensures that the request is ready to be acted upon immediately after it is claimed.

In some implementations, scheduling platform 225 may cause the product to be delivered. For example, scheduling platform 225 may provide, to courier device 240 associated with the courier, data that causes the courier to transport the product from the product location to the geographic location. In some implementations, scheduling platform 225 may provide the data based on a notification time. In some implementations, scheduling platform 225 may determine the notification time by subtracting, from the delivery time, an amount of time associated with the delay. By using the delay to determine the notification time, scheduling platform 225 withholds providing information regarding the request until it is ready to be acted upon by courier device 240 (and/or the courier associated with the courier device), obviating any need to store information related to the request at courier device 240 when the information is not ready to be acted upon.

In some implementations, scheduling platform 225 may broadcast information related to the request to multiple courier devices 240 based on the delay. For example, using the delay, scheduling platform 225 may broadcast data to an application operating on multiple courier devices 240, the data enabling couriers associated with the corresponding courier devices 240 to accept the delivery request. In this way, scheduling platform 225 may enable multiple entities to claim responsibility for delivering the product, and by using the delay to determine when to broadcast the request, scheduling platform 225 ensures that the request is ready to be acted upon immediately after it is claimed. In some implementations, scheduling platform 225 may further delay the sending of information related to a request to courier device 240. For example, in a situation where fulfillment time may be long (e.g., meets a threshold fulfillment time), scheduling platform 225 may further delay sending information regarding the request to courier device 240 (e.g., by reducing the delay by the fulfillment time, sending information in response to receiving an indication that the product is ready to be delivered, and/or the like).

In some implementations, after receiving the request, scheduling platform 225 may receive a second (e.g., different) request for a second (e.g., different) product. In this situation, scheduling platform 225 may determine a second (e.g., different) delay based on the second request, and may insert the second request into the data structure based on the second delay. In some implementations, scheduling platform 225 may perform an action to remove, based on the delay (e.g., associated with the request received at block 410) and the second delay, the second request from the data structure before the request is removed from the data structure, and to provide, to a device associated with the product location (e.g., product location device 220), data associated with the second request. In this way, scheduling platform 225 may prioritize causing product preparation and delivery for some requests over others based on their corresponding delays.

In some implementations, scheduling platform 225 may perform an action to adjust, in the data structure, the delay associated with the request. For example, scheduling platform 225 may adjust the delay associated with a request based on the receipt of a second request. In a situation where preparation and delivery of the second request may interfere with preparation and delivery of the request, delay values may be adjusted (e.g., causing preparation and delivery for one or both requests to be initiated earlier, or later, than the initial delay values would have caused).

While a variety of example actions are described above, scheduling platform 225 may be capable of performing a variety of actions designed to manage a data structure for facilitating product preparation and delivery. In this way, scheduling platform 225 may perform an action based on the request and the delay.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As a particular example of process 400, scheduling platform 225 may include a platform utilized by a bank that desires to offer quick delivery of banking products (e.g., credit cards, debit cards, cash, cashier's checks, and/or the like) that might require some preparation by banking devices and/or banking personnel. In this situation, a user of user device 210 may send a request for a cashier's check to scheduling platform 225, such as while using a banking application operating on user device 210. The request may include a geographic location for delivery (e.g., a home address of the user). Additionally, the user may request delivery of the cashier's check at a particular time, such as when the user will be home, or as soon as possible.

Continuing with the example, scheduling platform 225 may identify a product location (e.g., a bank branch, ATM, warehouse location, storage locker, and/or the like) that might have the requested product and a courier (e.g., a drone device, independent contractor delivery service, and/or the like). For example, scheduling platform 225 may identify a bank branch location as the product location and an independent contractor delivery service as the courier.

Continuing with the example, scheduling platform 225 may then determine a delay by calculating a fulfillment time for the product location (e.g., the time it takes for a qualified person or machine at the bank branch to have the cashier's check ready for pickup by a courier). This may depend on how long the cashier's check takes, how busy the bank is, how busy the equipment/personnel used to prepare the cashier's check is, and/or the like. In determining the delay, scheduling platform 225 may also take the estimated delivery time into account (e.g., how long it would take the independent contractor delivery service to deliver the cashier's check once it is prepared at the bank branch). The delay may also depend on information obtained from third party devices, such as weather information, traffic information, how busy the delivery service is, and/or the like.

Continuing with the example, upon determining the delay, scheduling platform 225 may associate the delay with the request by inserting the request (and the delay) in a queue with other requests. The particular location in the queue in which scheduling platform 225 inserts the request may depend on other requests already in the queue, and the delays associated with the other requests. Scheduling platform 225 may store the requests in the queue until they are ready to be acted upon.

Scheduling platform 225 may then perform an action, such as waiting until the delivery time, minus the delay, and then sending a notification to a product location device at the bank branch to prepare the cashier's check for delivery. At the same time, or at a later time, scheduling platform 225 may broadcast, to courier devices associated with the delivery service, data indicating that the cashier's check will be available for pickup at the bank branch and need to be delivered to the user's home address at a particular time specified by the user.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-based device for product preparation and delivery, comprising:
   one or more memories; and
   one or more processors, communicatively coupled to the one or more memories, configured to:
      receive, from a first device, a request for a product,
         the first device comprising a sensor configured to determine information associated with a location of the first device;
      receive, based on the request, information associated with a geographic location for delivery of the product based on the information determined by the sensor and received from the first device,
         the geographic location is based upon the location of the first device,
            the location of the first device is periodically updated based upon sensor data provided by the sensor;
      determine, from the sensor data, a speed associated with the first device and a direction of travel associated with the location of the first device and an updated location of the first device;
      predict the geographic location for delivery of the product and a delivery time of the product from the speed, the direction of travel, and the updated location of the first device;
      send, to the first device, an outbound notification to confirm the geographic location for delivery of the product when the speed associated with the first device satisfies a threshold,
         the outbound notification includes a request for the first device to confirm the geographic location for delivery of the product;
      identify, based on the request for the product, a product location,
         the product location is associated with a product location device,
            the product location device comprising another sensor configured to determine information associated with the product location,
         the product location is a location from which the product is capable of being provided,
         the product location is associated with at least one courier,
            the at least one courier is capable of transporting the product from the product location to the geographic location,
            the at least one courier is associated with at least one courier device,
         the product location is identified based on a threshold distance,
            the threshold distance is based upon at least one of:
               a range characteristic associated with the updated location of the first device,
               a range characteristic associated with the product location device, or
               a range characteristic associated with the at least one courier device;
      determine, based on the product and at least one product location characteristic, an estimated fulfillment time,
         the estimated fulfillment time indicating a first amount of time associated with preparing the product for delivery at the product location;
      determine, based on the geographic location, the delivery time, and the product location, an estimated delivery time,
         the estimated delivery time indicating a second amount of time associated with obtaining the product from the product location and delivering the product to the geographic location;
      provide a delay model with at least one of the one or more product location characteristics and at least one of one or more courier characteristics,
         the delay model is configured to output information related to scores associated with particular combinations of the product location and a particular courier;
      receive, as a first output of the delay model, a plurality of scores related to the particular combinations of the product location and the courier,
         the plurality of scores are ranked to identify a particular product location and courier combination to select;
      select the particular product location and courier combination based on the ranking;
      receive, as a second output of the delay model, information regarding a third amount of time based on the particular product location and courier combination being selected,
         the third amount of time is associated with a delay,
            the delay is associated with the estimated fulfillment time and the estimated delivery time;
      insert the request for the product into a queue based on the delay,
         the request is inserted into a position in the queue before or after other requests based on the delay and delays associated with the other requests,
            the delays associated with the other requests are determined based on the delay model;
      determine a notification time for performing an action,
         the notification time is determined based upon subtracting the third amount of time associated with the delay from the delivery time;
      perform the action,
         the action is associated with causing the product to be prepared based upon the notification time;
      obtain delivery data indicating a completion time associated with delivery of the product to the geographic location; and
      update the delay model based on the completion time.

2. The computer-based device of claim 1, where the one or more processors are further configured to:
   obtain at least one environmental characteristic from a third party device; and determine the delay further based on the at least one environmental characteristic.

3. The computer-based device of claim 2, where the one or more processors are further configured to:
receive, from the product location device, data indicating that the product will not be prepared for delivery; and
provide, to another device associated with the product location and based on the data indicating that the product will not be prepared for delivery, data that causes an entity associated with the another device to prepare the product for delivery.

4. The computer-based device of claim 1, where the one or more processors are further configured to:
provide, to the at least one courier device associated with the at least one courier, data that causes the at least one courier to transport the product from the product location to the geographic location.

5. The computer-based device of claim 4, where the one or more processors are further configured to:
determine a delivery notification time by subtracting the third amount of time from the delivery time; and
where the one or more processors, when providing data that causes the at least one courier to transport the product from the product location to the geographic location, are configured to provide the data based on the delivery notification time.

6. The computer-based device of claim 1, where the one or more processors are further configured to:
obtain at least one environmental characteristic from a third party device; and
provide the at least one environmental characteristic to the delay model.

7. The computer-based device of claim 1, where the one or more processors are further to:
obtain historical delay data indicating an amount of time associated with previous requests, the previous requests are associated with the product and the product location, and the historical delay data is provided to the delay model.

8. The computer-based device of claim 1, where the one or more processors are further configured to:
determine that a measure of confidence associated with the estimated delivery time does not meet a confidence threshold; and
utilize one or more different values to determine the estimated delivery time based on the measure of confidence not meeting the confidence threshold,
the one or more different values including one or more of:
historical data indicating an amount of time associated with previous requests provided to the delay model, or
the estimated delivery time produced by the delay model.

9. A non-transitory computer-readable medium storing instructions, the instructions comprising:
one or more instructions that, when executed by one or more processors, cause the one or more processors to:
receive, from a first device, a request for a product,
the first device comprising a sensor configured to determine information associated with a location of the first device;
receive, based on the request, information associated with a geographic location for delivery of the product based on the information determined by the sensor and received from the first device,
the geographic location is based upon a location of the first device,
the location of the first device is periodically updated based upon sensor data provided by the first device;
determine, from the sensor data, a speed associated with the first device and a direction of travel associated with the location of the first device and an updated location of the first device;
predict the geographic location for delivery of the product and a delivery time of the product from the speed, the direction of travel, and the updated location of the first device;
send, to the first device, an outbound notification to confirm the geographic location for delivery of the product when the speed associated with the first device satisfies a threshold,
the outbound notification includes a request for the first device to confirm the geographic location for delivery of the product;
identify, based on the request for the product, a product location,
the product location is associated with a product location device,
the product location device comprising another sensor configured to determine information associated with the product location,
the product location is a location from which the product is capable of being provided,
the product location is associated with at least one courier,
the at least one courier is capable of transporting the product from the product location to the geographic location,
the at least one courier is associated with at least one courier device,
the product location is identified based on a threshold distance,
the threshold distance is based upon at least one of:
a range characteristic associated with the updated location,
a range characteristic associated with the product location device, or
a range characteristic associated with the at least one courier device;
obtain, for the product location, one or more product location characteristics;
obtain, for the at least one courier, one or more courier characteristics;
provide a delay model with at least one or more of the one or more product location characteristics and at least one of the one or more courier characteristics,
the delay model is configured to output information related to scores associated with particular combinations of the product location and a particular courier;
receive, as a first output of the delay model, a plurality of scores related to the particular combinations of the product location and the courier,
the plurality of scores are ranked to identify a particular product location and courier combination to select;
select the particular product location and courier combination based on the ranking;

receive, as a second output of the delay model, information regarding a third amount of time based on the particular product location and courier combination selected,
the third amount of time is associated with a delay, the delay is associated with an estimated fulfillment time and an estimated delivery time;
insert the request for the product into a queue based on the delay,
the request is inserted into a position in the queue before or after other requests based on the delay and delays associated with the other requests,
the delays associated with the other requests are determined based on the delay model;
determine a notification time for performing an action,
the notification time is determined based upon subtracting the third amount of time associated with the delay from the delivery time;
perform the action,
the action is associated with causing the product to be prepared based upon the notification time;
obtain delivery data indicating a completion time associated with delivery of the product to the geographic location; and
update the delay model based on the completion time.

10. The non-transitory computer-readable medium of claim 9, where the one or more product location characteristics include at least one of:
a first characteristic indicating a quantity of qualified product providers that are associated with the product location,
each qualified provider, of the quantity of qualified product providers, is an entity capable of preparing, at the product location, the product for delivery;
a second characteristic indicating an availability for at least one of the qualified product providers; or
a third characteristic indicating a preparation time associated with preparation of the product for delivery.

11. The non-transitory computer-readable medium of claim 9, where the one or more courier characteristics include at least one of:
a first characteristic indicating an availability of the at least one courier; or
a second characteristic indicating the estimated delivery time associated with delivering the product to the geographic location.

12. The non-transitory computer-readable medium of claim 9, where the one or more instructions, when executed by the one or more processors, further cause the one or more processors to:
obtain at least one environmental characteristic from a third party device; and
provide the at least one environmental characteristic to the delay model.

13. The non-transitory computer-readable medium of claim 12, where the at least one environmental characteristic includes:
a weather characteristic indicating weather conditions associated with the geographic location, the product location, and/or an area between the geographic location and the product location; and
a traffic characteristic indicating traffic conditions associated with the geographic location, the product location, and/or the area between the geographic location and the product location.

14. The non-transitory computer-readable medium of claim 9, where the one or more instructions, when executed by the one or more processors, further cause the one or more processors to:
obtain historical delay data indicating an amount of time associated with previous requests, the previous requests are associated with the product and the product location, and the historical delay data is provided to the delay model.

15. A method compromising:
receiving, by a first device and from a second device, a request for a product,
the second device comprising a sensor configured to determine information associated with a location of the second device;
receiving, by the first device and based on the request, information associated with a geographic location for delivery of the product based on information determined by the sensor and received from the second device,
the geographic location is based upon a location of the second device,
the location of the second device is periodically updated based upon sensor data provided by the first device;
determining, from the sensor data, a speed associated with the first device and a direction of travel associated with the location of the first device and an updated location of the first device;
predicting the geographic location for delivery of the product and a delivery time of the product from the speed, the direction of travel, and the updated location of the first device;
sending, to the first device, an outbound notification to confirm the geographic location for delivery of the product when the speed associated with the first device satisfies a threshold,
the outbound notification includes a request for the first device to confirm the geographic location for delivery of the product;
identifying, by the first device and based on the request for the product, a product location,
the product location is associated with a product location device,
the product location device comprising another sensor configured to determine information associated with the product location,
the product location is a location from which the product is capable of being provided,
the product location is associated with at least one courier,
the at least one courier is capable of transporting the product from the product location to the geographic location,
the at least one courier is associated with at least one courier device, the product location is identified based on a threshold distance,
the threshold distance is based upon at least one of:
a range characteristic associated with the updated location of the second device,
a range characteristic associated with the product location device, or
a range characteristic associated with the at least one courier device;
obtaining, by the first device and for the product location, one or more product location characteristics;

obtaining, by the first device and for the courier, one or more courier characteristics;
providing, by the first device, a delay model with at least one of the one or more product location characteristics and at least one of the one or more courier characteristics,
   the delay model is configured to output information related to scores associated with particular combinations of the product location and a particular courier;
receiving, by the first device and as a first output of the delay model, a plurality of scores related to the particular combinations of the product location and the courier,
   the plurality of scores are ranked to identify a particular product location and courier combination to select;
selecting, by the first device, the particular product location and courier combination based on the ranking;
receiving, by the first device, as a second output of the delay model, information regarding a first amount of time based on the particular product location and courier combination selected,
   the first amount of time is associated with a delay associated with the request; inserting, by the first device, the request for the product into a queue based on the delay,
     the request is inserted into a position in the queue before or after other requests based on the delay and delays associated with the other requests,
      the delays associated with the other requests are determined based on the delay model;
determining, by the first device, a notification time for performing an action,
   the notification time is determined based upon subtracting the first amount of time associated with the delay from the delivery time;
performing, by the first device, the action based on the queue;
obtaining, by the first device, delivery data indicating a completion time associated with delivery of the product to the geographic location; and
updating, by the first device, the delay model based on the completion time.

16. The method of claim 15, further comprising:
obtaining historical delay data indicating an amount of time associated with previous requests,
   the previous requests are associated with the product and the product location; and
providing the historical delay data to the delay model.

17. The method of claim 15, further comprising:
determining that a current time is equal to the delivery time minus the delay;
obtaining, based on the determination that the current time is equal to the delivery time minus the delay, the request from the queue; and
providing, to the product location device associated with the product location, data associated with the request after obtaining the request from the queue.

18. The method of claim 15, further comprising:
receiving, after receipt of the request for the product, a second request for a second product;
determining a second delay based on the second request; and
inserting the second request into the queue based on the second delay.

19. The method of claim 18, further comprising:
removing, based on the delay and the second delay, the second request from the queue before the request is removed from the queue; and
providing, to the product location device associated with the product location, data associated with the second request.

20. The method of claim 18, further comprising:
adjusting, in the queue, the delay associated with the request, based on the second request.

* * * * *